(12) United States Patent
Cheney

(10) Patent No.: US 6,745,934 B2
(45) Date of Patent: Jun. 8, 2004

(54) SEQUENTIAL DEVICE START-UP GUIDE

(75) Inventor: Douglas A. Cheney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 124 days.

(21) Appl. No.: 10/236,423

(22) Filed: Sep. 6, 2002

(65) Prior Publication Data

US 2004/0046013 A1 Mar. 11, 2004

(51) Int. Cl.[7] .................................................. G06F 17/00

(52) U.S. Cl. ...................................................... 235/375

(58) Field of Search ................................. 235/375, 487; 40/299.01, 360; 283/117

(56) References Cited

U.S. PATENT DOCUMENTS 6,617,803 B2 * 9/2003 Harris .................... 315/185 R

* cited by examiner

Primary Examiner—Michael G. Lee
Assistant Examiner—Jamara A. Franklin

(57) ABSTRACT

A start-up guide is associated with a system, such as an imaging system, including shipping elements at a plurality of locations in or on the system. The shipping elements are of a type that should be removed from the system in a predetermined sequence prior to initial operation of the system. The start-up guide includes a removable location indicator at each of the locations at which shipping elements to be removed is located. A linear linking element sequentially connects the location indicators in an order corresponding to the sequence in which the shipping elements are to be removed.

19 Claims, 2 Drawing Sheets

SEQUENTIAL DEVICE START-UP GUIDE

FIELD OF THE INVENTION

The invention relates generally to facilitating initial set-up of equipment. Specifically, the invention relates to improving the ease of use and reliability of start-up instructions for equipment users.

BACKGROUND OF THE INVENTION

Imaging systems such as printers, fax machines, and copiers are virtually omnipresent, and can be found in homes and offices worldwide. The development of such systems has facilitated improvements in communications that have in turn fostered profound changes in the ways that people live and work. Telecommuting, "virtual" offices, and intra-office networks represent but a few examples of the advancements that have been made possible by modern imaging systems.

The wide distribution of imaging systems has spawned the development of packaging and locking systems adequate to protect relatively sensitive electronic components within the systems during transportation and storage. Such packaging and shipping locks are herein collectively referred to as "shipping elements". Such shipping elements may, for example, be provided as packing materials including plastic foam cushions surrounding portions of the system, or a rigid container such as a corrugated fiberboard box surrounding the system. Additionally, protective packing material is provided on levers, door, drawers, trays, closures, and other system parts to protect them during shipping. In a further example, drawers and trays are frequently provided with a locking mechanism to minimize movement during shipping.

All shipping elements must be removed prior to using the systems. Such removal typically requires opening or otherwise manipulating various elements of the system to access "hidden" materials and locking mechanisms. Failure to remove all shipping elements can result in failure of the system to work properly, and may even cause damage to the system itself. At the very least, unremoved shipping elements can cause user annoyance and frustration, tech support center calls, and system downtime.

The principal method used to ensure proper unpacking and setup is to provide detailed instructions in the system user manual. One example typical of such instructions is provided with the LaserJet® 8550 imaging system manufactured by the Hewlett-Packard Company. The setup instructions for this system include sixteen separate steps detailing the location of various materials and presenting illustrated procedures for their removal. The steps are in a specific sequence. In some instances, the steps are in a particular sequence because the location of materials make it convenient to perform steps. In other instances, it is physically necessary to perform one step before another to avoid damage to the system. For example, in the LaserJet® 8550 set-up procedure, damage to the unit will occur unless the packing materials in the printer are removed pursuant to Step 6 before the release lever is operated to perform the actions in Step 7.

The instructions are typically contained in the User Manual, Getting Started Guide, "Read Me First" sheet, or other documentation. Drawing details are provided to show the locations of out-of-sight drawers, trays, and panels. It is critical for a person responsible for setting up the system to find, read, and follow each unpacking step in the setup manual to ensure optimal functioning of the system. Unfortunately, it is not unusual for the instructions in the manual to be ignored or misunderstood, or for the manual to be misplaced, separated, or missing from the system. If this is the case, there is little chance of successfully locating and removing all of the shipping elements.

Despite the best efforts of the system manufacturer to make it easy to locate, understand, and follow setup instructions, there exists no relatively fail-safe way to ensure proper unpacking and setup. It can be seen from the foregoing that the need exists for a simple, inexpensive, method and apparatus for increasing the likelihood of proper system setup.

SUMMARY OF THE INVENTION

The present invention is directed to a start-up guide associated with a system, such as an imaging system, including shipping elements at a plurality of locations in or on the system. The shipping elements are of a type that should be removed from the system in a predetermined sequence prior to initial operation of the system. The start-up guide includes a removable location indicator at each of the locations at which shipping elements to be removed is located. A linear linking element sequentially connects the location indicators in an order corresponding to the sequence in which the shipping elements are to be removed.

DETAILED DESCRIPTION OF THE INVENTION

Figure 1:
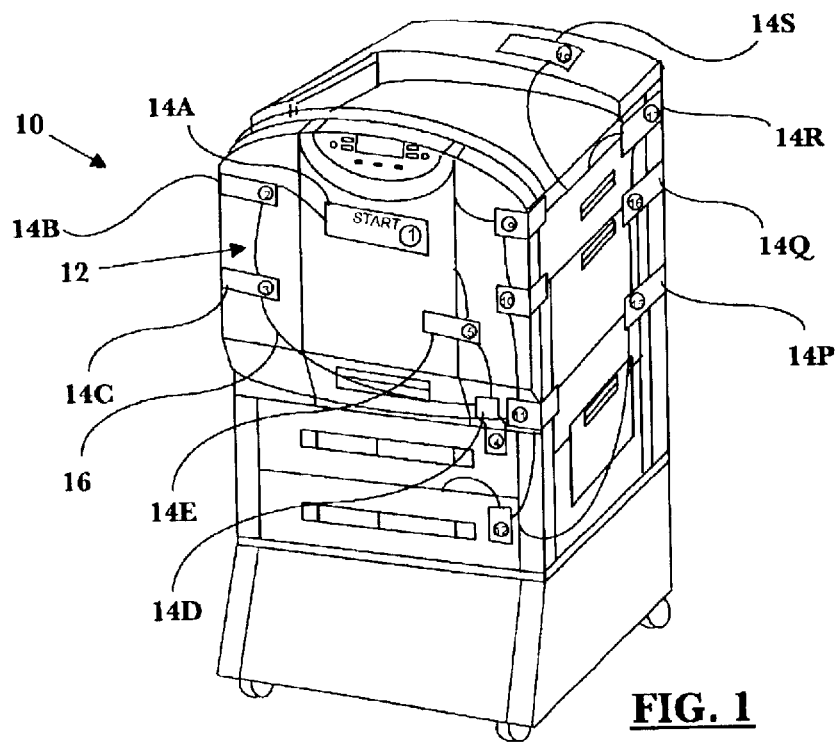
FIG. 1 is a schematic perspective view of an imaging system incorporating an embodiment of a sequential start-up guide in accordance with the principles of the present invention.
Figure 2:
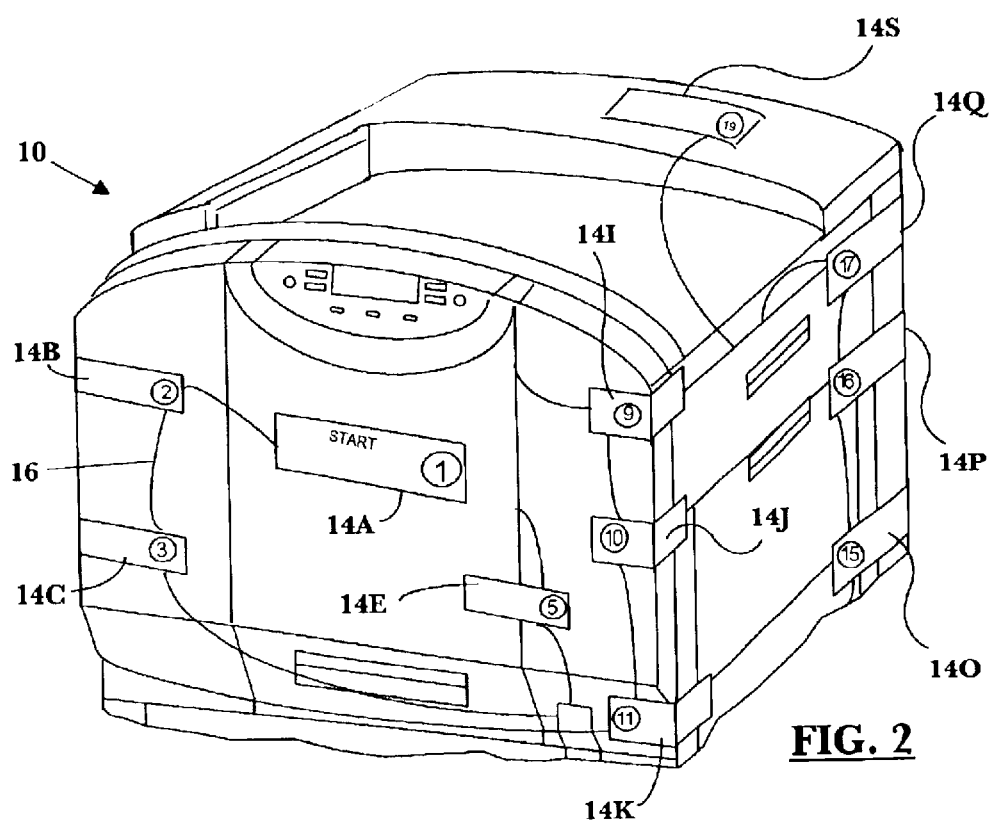
FIG. 2 is a detailed perspective view of the FIG. 1 system.

FIGS. 1 and 2. illustrate an imaging system 10. Although the imaging system 10 is illustrated as an HP LaserJet® 8550, it is to be understood that the principles of the present invention are applicable to any system in which shipping elements are to be removed from multiple locations prior to system operation. The imaging system 10 is in its pre-setup state, i.e., shipping elements placed at various locations in the imaging system 10 for protection during shipping of the imaging system 10 are still in place.

A start-up guide 12 in accordance with the principles of the present invention is provided on the imaging system 10. The start-up guide 12 includes a plurality of location indicators 14A–14S. The location indicators are placed on or in the imaging system 10 at each of the locations at which shipping elements to be removed are located, and can be secured to the imaging system 10 in any suitable manner. It is contemplated that a removable adhesive would provide a suitable securing mechanism, such as an applied adhesive, static adhesion, or other known arrangement. In the illustrated system 10, some of the location indicators 14A–14S are placed inside the imaging system 10, at locations within trays or behind doors or panels, and thus cannot be seen in FIGS. 1 and 2.

Figure 3:
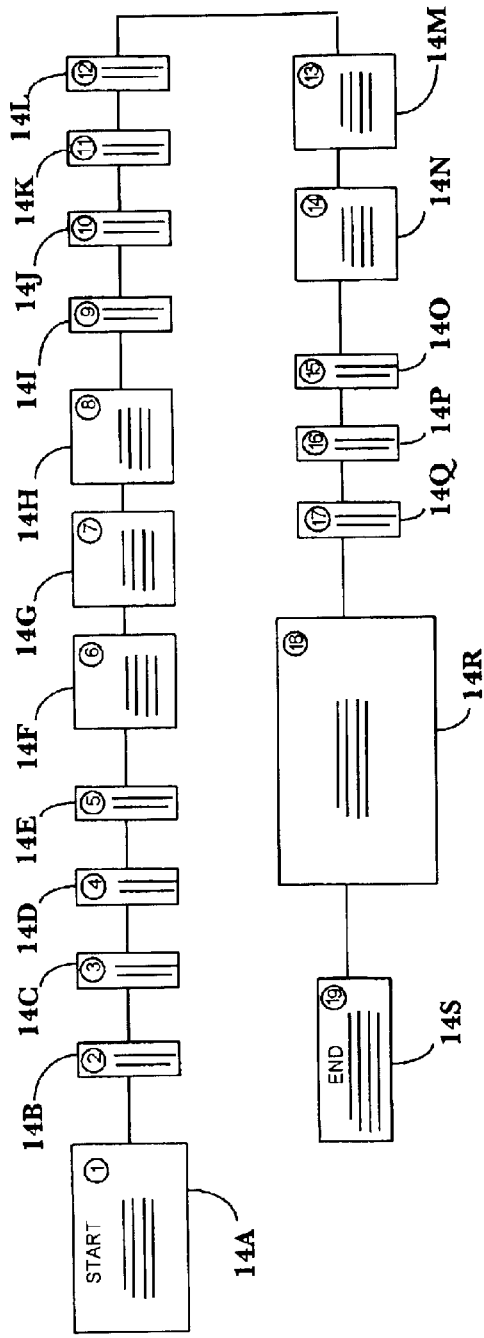
FIG. 3 is a schematic view of an embodiment of a sequential start-up guide in accordance with the principles of the present invention.

The location indicators 14A–14S are connected together using a generally linear linking element 16. As shown in FIG. 3, the linking element 16 is advantageously provided as a continuous, flexible line, such as string, tape, monofilament, or cord, and links the location indicators 14A–14S together sequentially. The illustrated linking element 16 is shown as a continuous string. However, it is also contemplated that the linking element 16 could be provided as a series of interconnected segments.

Figure 4:
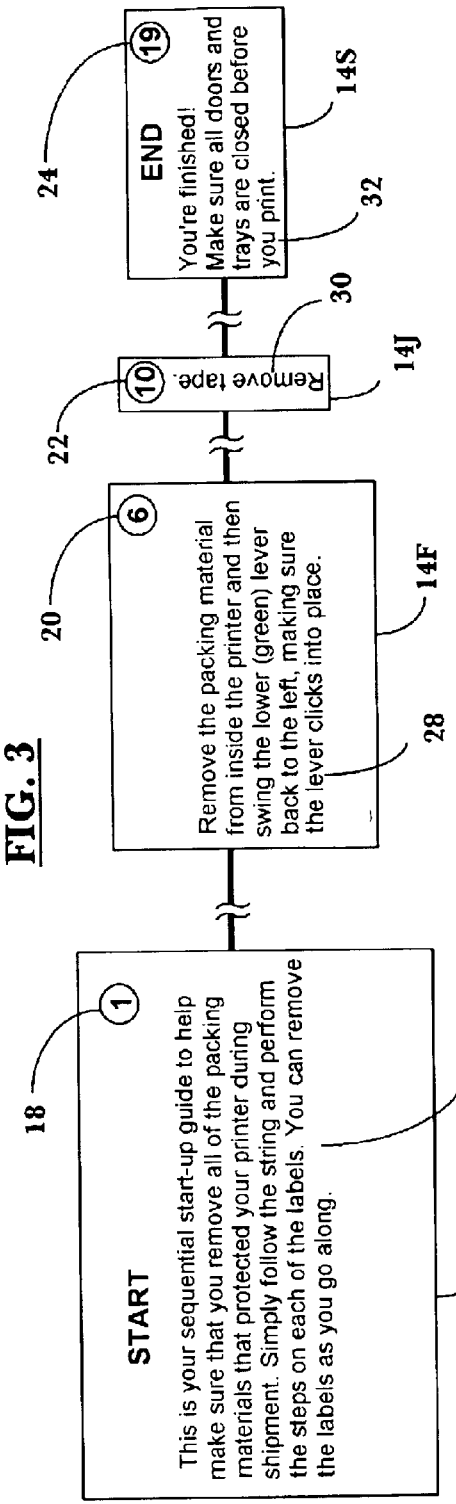
FIG. 4 is a detailed view of the FIG. 3 start-up guide.

As shown in FIG. 4, the location indicators 14A–14S include sequence indicia 18–24. The sequence indicia 18–24 can be provided as any graphically representational sequence indicator, such as numbers, letters, or other symbology. The illustrated location indicators 14A–14S also include shipping elements removal instructions, here show as textual instructions 26–32. Of course, the removal instructions can be provided in any suitable form, such as graphical illustrations, audio displays, or video displays. It is also contemplated that the instructions corresponding to the steps to be taken at some or all of the location indicators could be detailed in a corresponding manual, with the location indicators serving merely to direct the user to the appropriate area at which the steps are to be performed.

In operation, the system user simply begins at the first location indicator, perceives the instructions associated with the location indicator, performs the necessary steps to remove the shipping element, removes the location indicator, and follows the linking element to the next location indicator. This is repeated until the linking element ends, at which time all of the location indicators have been removed and all start-up steps performed.

Although the present invention has been described with reference to specific embodiments, those of skill in the art will recognize that changes may be made thereto without departing from the scope and spirit of the invention as defined by the appended claims.

What is claimed is:

1. In a system including shipping elements at a plurality of locations in or on the system, at least some of the shipping elements being of a type that should be removed from the system prior to initial operation of the system, a start-up guide comprising the following:
    a removable location indicator at each of the locations at which shipping elements to be removed is located;
    sequence indicia on the location indicators denoting a sequence in which the shipping elements are to be removed; and
    a generally linear linking element connecting the location indicators in an order corresponding to the sequence indicia.

2. A start-up guide in accordance with claim 1, wherein the sequence indicia are chosen from a group consisting of letters and numbers.

3. A start-up guide in accordance with claim 2, wherein the sequence indicia comprise numbers.

4. A start-up guide in accordance with claim 1, wherein the removable location indicators further comprise shipping elements removal instructions.

5. A start-up guide in accordance with claim 1, wherein the generally linear linking element comprises string.

6. A start-up guide in accordance with claim 1, wherein the generally linear linking element comprises tape.

7. A start-up guide in accordance with claim 1, further comprising removable adhesive securing the location indicators to the system.

8. In an imaging system including shipping elements at a plurality of locations in or on the system, the shipping elements being of a type that should be removed from the system in a predetermined sequence prior to initial operation of the system, a start-up guide comprising the following:
    a removable location indicator at each of the locations at which shipping elements to be removed is located; and
    a linear linking element sequentially connecting the location indicators in an order corresponding to a sequence in which the shipping elements are to be removed.

9. A start-up guide in accordance with claim 8, further comprising sequence indicia on the location indicators.

10. A start-up guide in accordance with claim 9, wherein the sequence indicia comprise numbers.

11. A start-up guide in accordance with claim 8, wherein the removable location indicators further comprise shipping elements removal instructions.

12. A start-up guide in accordance with claim 8, wherein the generally linear linking element is chosen from a group consisting of string and tape.

13. A start-up guide in accordance with claim 8, further comprising removable adhesive securing the location indicators to the imaging system.

14. A start-up guide in accordance with claim 8, wherein the removable location indicators further comprise shipping elements removal instructions.

15. A method in accordance with claim 8, wherein the step of providing a removable location indicator at each of the locations further comprises securing the location indicators to the imaging system using removable adhesive.

16. In an imaging system including shipping elements at a plurality of locations in or on the system, the shipping elements being of a type that should be removed from the system in a predetermined sequence prior to initial operation of the system, a method for indicating the sequence in which shipping elements are to be removed, the method comprising the following steps:
    providing a removable location indicator at each of the locations at which shipping elements to be removed is located; and
    sequentially connecting the location indicators, in an order corresponding to the sequence in which the shipping elements are to be removed, with a linear linking element.

17. A method in accordance with claim 16, wherein the step of providing removable location indicators further comprises providing sequence indicia on the location indicators.

18. A method in accordance with claim 17, wherein the step of providing sequence indicia on the location indicators comprises providing sequential numbers on the location indicators.

19. A method in accordance with claim 16, wherein the step of sequentially connecting the location indicators further comprises connecting the location indicators together using a generally linear linking element chosen from a group consisting of string and tape.

* * * * *